United States Patent [19]

Ramsey

[11] 4,317,591

[45] Mar. 2, 1982

[54] VEHICLE SEAT BOLSTER WIRE ASSEMBLY

[75] Inventor: Eugene P. Ramsey, Sterling Heights, Mich.

[73] Assignee: General Motors Corporation, Detroit, Mich.

[21] Appl. No.: 153,025

[22] Filed: May 27, 1980

[51] Int. Cl.³ .............................................. A47C 7/02
[52] U.S. Cl. ................................................. 297/455
[58] Field of Search .......... 297/452, DIG. 1, DIG. 2, 297/456, 455

[56] References Cited

U.S. PATENT DOCUMENTS

| | | | |
|---|---|---|---|
| 3,266,066 | 8/1966 | Bereday | 297/452 |
| 3,727,980 | 4/1973 | Tischler | 297/452 |
| 3,961,823 | 6/1976 | Caudill, Jr. | 297/452 |
| 4,025,114 | 5/1977 | Cave | 297/452 |

FOREIGN PATENT DOCUMENTS 2023803  12/1971  Fed. Rep. of Germany .

*Primary Examiner*—Doris L. Troutman
*Attorney, Agent, or Firm*—Charles E. Leahy

[57] ABSTRACT

A bolster wire assembly for attaching a seat cover to a resilient foam seat cushion includes a bolster wire, a stabilizing wire, and an anchor wire. The bolster wire extends continuously along the bottom wall of a slot in the foam cushion. The stabilizing wire extends in general parallel relation from the bolster wire in laterally spaced relation therefrom and is embedded within the foam cushion. The anchor wire extends in generally parallel relation from the bolster wire and is embedded within the foam cushion generally adjacent the mounting surface of the cushion which rests upon the seat frame. Connecting wires act between the stabilizing wire and the bolster wire to anchor the bolster wire against lateral movement in the seat cushion. Hog ring fasteners are receivable through the cushion slot for attaching the seat cover to the bolster wire. Additional hog ring fasteners attach the anchor wire to the seat frame. Connecting wires also act between the bolster wire and the anchor wire to anchor the bolster wire against movement relative the seat frame and thereby attach the foam cushion and seat cover to the seat frame.

3 Claims, 3 Drawing Figures

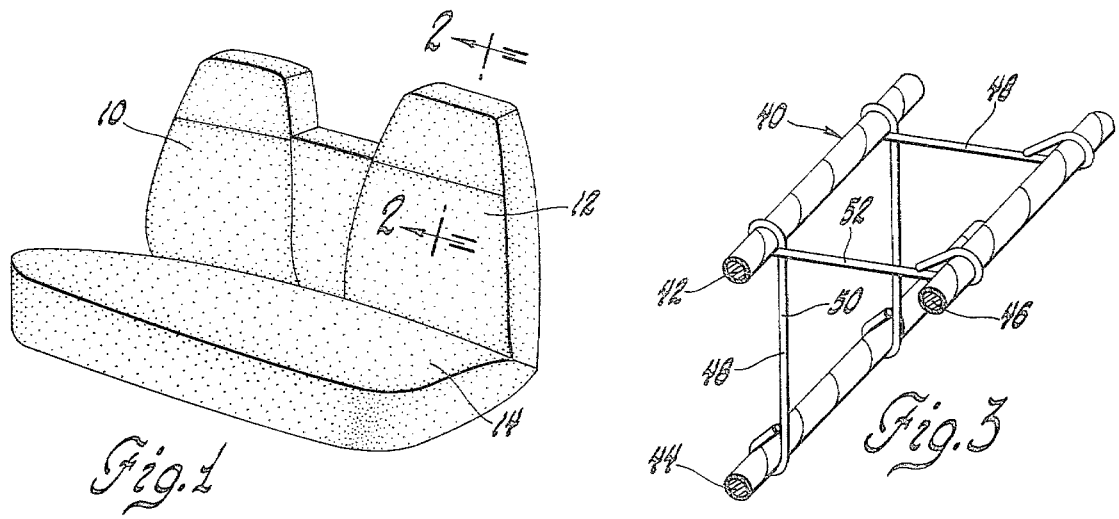
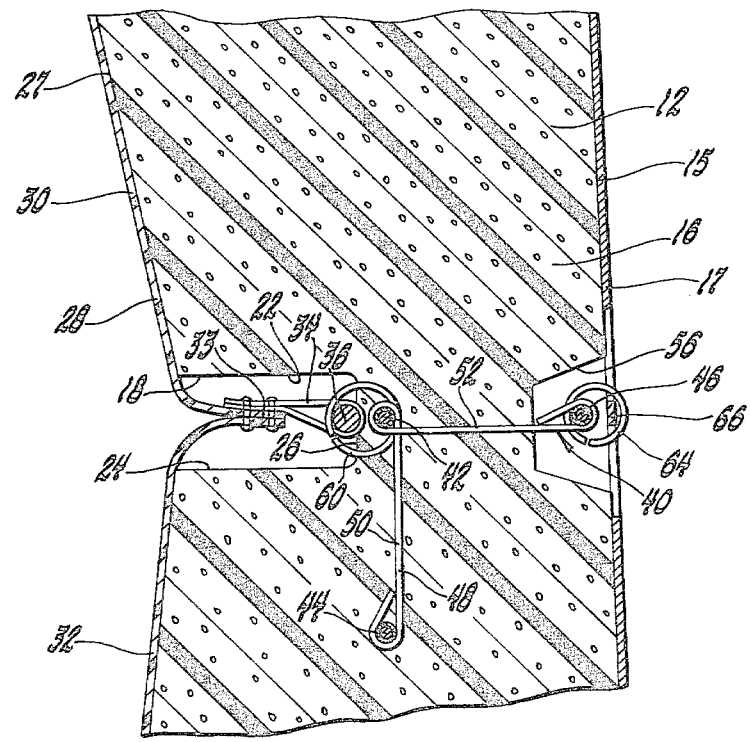

VEHICLE SEAT BOLSTER WIRE ASSEMBLY

The invention relates to a vehicle seat and more particularly to a bolster wire assembly for attaching a seat cover to a resilient foam cushion and for attaching the foam cushion to the seat frame.

BACKGROUND OF THE INVENTION

Conventional vehicle seats include a resilient foam cushion which rests upon a seat frame and a fabric or vinyl seat cover for covering the foam cushion. It is desirable in such vehicle seats to provide a slot in the surface of the foam cushion and to anchor the seat cover in the slot so as to define an aesthetically pleasing seat contour and to attach the seat cover to the foam cushion.

It is known to attach a seat cover to the foam cushion by hog ringing a list wire attached to the underside of the seat cover to a bolster wire embedded in the foam cushion.

One shortcoming of the aforedescribed seat construction is that the tension applied to the seat cover during seating of an occupant tends to pull the bolster wire out of the foam cushion. It is known to provide various bolster wire anchoring devices such as plastic mesh strip or metal anchor discs which are embedded in the foam cushion below the surface and attached to the bolster wire to anchor the bolster wire against dislodgement from its intended position.

It is desirable in down-sized motor vehicles to utilize a foam cushion of reduced thickness in order to reduce the vehicle weight and maximize the space available for occupant seating. However, reduction of thickness of the foam cushion permits the tension on the seat cover to impart a bow to the bolster wire, thereby causing a lack of styling definition and permitting the foam cushion to move away from the seat frame.

SUMMARY OF THE INVENTION

The present invention provides an improved bolster wire assembly which provides for attachment of the bolster wire assembly and seat cushion to the seat frame as well as attachment of the seat cover to the foam cushion.

According to the present invention, a bolster wire assembly includes a bolster wire extending continuously along the bottom wall of a slot in the foam cushion. A stabilizing wire extends in general parallel relation from the bolster wire in laterally spaced relation therefrom and is embedded within the foam cushion. An anchor wire extends in generallty parallel relation from the bolster wire and is embedded within the foam cushion generally adjacent the mounting surface of the cushion which rests upon the seat frame. Connecting wires act between the stabilizing wire and the bolster wire to anchor the bolster wire against lateral movement in the seat cushion. A hog ring fastener is receivable through the cushion slot for attaching the seat cover to the bolster wire at any selected point along the continuous length of the bolster wire. Additional hog ring fasteners attach the anchor wire to the seat frame. Connecting wires acting between the bolster wire and the anchor wire to anchor the bolster wire against movement relative the seat frame and thereby attach the foam cushion and seat cover to the seat frame.

BRIEF DESCRIPTION OF THE DRAWINGS

These and other objects, features and advantages of the invention will become apparent upon consideration of the specification and the appended drawings in which:

FIG. 1 is a perspective view of a vehicle seat;

FIG. 2 is a sectional view taken in the direction of arrows 2—2 of FIG. 1; and

FIG. 3 is a perspective view of the bolster wire assembly.

DESCRIPTION OF THE PREFERRED EMBODIMENT

Referring to FIG. 1, a vehicle seat 10 includes a seat back 12 and a seat bottom 14. As best seen in FIG. 2, the seat back 12 includes a molded resilient foam cushion 16 having a mounting surface 15 adapted for placement upon a stamped metal seat frame 17. The mold in which the resilient foam cushion 16 is molded defines a cushion slot 18 defined by side walls 22 and 24 and a bottom wall 26.

The resilient foam cushion 16 also has a seating surface 27 covered by a conventional fabric or vinyl seat cover 28 including an upper portion 30 and a lower portion 32 which are sewn together at 33. A conventional fabric list 34 is sewn to the seat cover portions 30 and 32 to capture a conventional list wire 36 therein.

A bolster wire assembly, indicated generally at 40, is embedded within the foam cushion 16. Bolster wire assembly 40 includes the bolster wire 42, a stabilizing wire 44, and an anchor wire 46 which have a wrapped paper covering and are connected in spaced relation as shown in FIG. 3 by connecting wires 48 provided at spaced intervals therealong. Each of the connecting wires 48 includes a leg 50 extending between the bolster wire 42 and stabilizing wire 44 and a leg 52 extending between the bolster wire 42 and the anchor wire 46.

Referring to FIG. 3, it will be understood that the bolster wire assembly 40 is placed in the mold prior to foaming of the foam cushion 16 and is conveniently supported within the mold by suitable clamps or the like which attach to the anchor wire 46. The mold defines a recess 56 in the foam cushion 16 to render the anchor wire 46 visible at spaced intervals therealong. The bolster wire 42 is preferably situated visibly adjacent the bottom wall 26 of the cushion slot 18. The stabilizing wire 44 is embedded in the foam cushion 16 in laterally spaced relation from the bolster wire 42.

Referring to FIG. 2, it will be understood that the seat cover 28 is attached to the seat cushion by conventional hog rings 60 which are installed to encircle the list wire 36 and the bolster wire 42 at spaced intervals along their length. The hog ringing operation is simplified by the visible presence of the bolster wire 42 at the bottom of the cushion slot 18. The anchor wire 46 is attached to the seat frame 17 by hog rings 64 which encircle the anchor wire 46 and an anchor tab 66 of the seat frame 17.

Referring to FIG. 2, it will be understood that the seat cover 28 is tensioned by the presence of a seated occupant thereon and the tension is transferred to the list wire 36 and bolster wire 42. The leg 50 of connecting wire 48 connects the embedded stabilizing wire 44 with the bolster wire 42 to anchor the bolster wire 42 against lateral shifting movement in the foam cushions 16. The leg 52 of the connecting wire 48 connects the bolster wire 42 with the anchor wire 46 so that the bolster wire 42 is anchored against movement relative the seating surface 27 of the foam cushion 16 and the foam cushion 16 and the bolster wire assembly 40 is mounted against movement away from the seat frame 17.

Thus, it is also seen that the invention provides a new and improved bolster wire assembly which enables attachment of a seat cover to a resilient foam cushion and also enables attachment of the foam cushion to the seat frame.

While the invention has been disclosed primarily in terms of the specific embodiment shown in the drawings, it is not intended to be limited thereto, but rather only to the extent set forth in the appended claims. For example, the stabilizing wire 44 and leg 50 of the connecting wire 48 may be replaced by any suitable means for anchoring the bolster wire 42 in the foam cushion.

The embodiments of the invention in which an exclusive property or privilege is claimed are defined as follows:

1. A bolster wire assembly for embedment in a resilient foam cushion to facilitate attachment of a seat cover on a seating surface of the foam cushion and attachment of a mounting surface of the foam cushon on a seat frame, said bolster wire assembly comprising:
   a longitudinally extending bolster wire adapted for placement in the foam cushion generally adjacent the seating surface thereof for attachment thereto of the seat cover;
   stabilizing means attached to the bolster wire and adapted for embedment in the foam cushion to anchor the bolster wire against movement in the foam cushion;
   a longitudinally extending anchor wire adapted for placement in the foam cushion generally adjacent the mounting surface thereof and adapted for attachment to the seat frame; and
   means connecting the anchor wire with the bolster wire at longitudinally spaced intervals therealong so that the bolster wire is anchored to the seat frame against movement within the foam cushion by the forces imposed on the bolster wire by the seat cover during seating of an occupant upon the vehicle seat.

2. A bolster wire assembly for embedment in a resilient foam cushion having a mounting surface resting upon a seat frame and an upwardly opening slot therein defined by side walls and a bottom wall to permit entry and attachment of a seat cover to the resilient foam cushion, said bolster wire assembly comprising:
   a bolster wire lying on the bottom wall of the slot and extending continuously therealong for attachment of the seat cover thereto;
   a stabilizing wire spaced laterally from the bolster wire for embedment in the foam cushion at a substantial lateral distance from the slot;
   an anchor wire embedded in the foam cushion adjacent the mounting surface thereof and adapted for attachment to the seat frame; and
   a plurality of connecting wires extending between the anchor wire, the bolster wire and the stabilizing wire at spaced longitudinal intervals therealong so that the stabilizing wire effectively anchors the bolster wire against lateral movement within the foam cushion and the anchor wire effectively mounts the bolster wire against vertical movement within the foam cushion by forces imposed upon the bolster wire by the seat cover.

3. A vehicle seat comprising:
   a seat cover;
   a seat frame;
   a resilient foam cushion having a seating surface with an upwardly opening slot therein defined by side walls and a bottom wall and a mounting surface;
   a bolster wire extending continuously along the bottom wall of the slot generally intermediate the side walls thereof;
   a stabilizing wire extending in generally parallel relation from the bolster wire in laterally spaced relation therefrom and embedded within the foam cushion;
   an anchor wire extending in generally parallel relation from the bolster wire and embedded within the foam cushion generally adjacent the mounting surface thereof;
   connecting wires acting respectively between the stabilizing wire and the bolster wire and between the bolster wire and the anchor wire;
   fastener means receivable through the slot for attaching the seat cover to the bolster wire at any selected point along the continuous length thereof; and
   fastener means attaching the anchor wire to the seat frame at any selected point therealong to attach the foam cushion to the seat frame.

* * * * *